United States Patent [19]

Ishikawa

[11] Patent Number: 5,280,361
[45] Date of Patent: Jan. 18, 1994

[54] DATA PROCESSING APPARATUS

[75] Inventor: Yuji Ishikawa, Yokohama, Japan

[73] Assignee: Canon Kabushiki Kaisha, Tokyo, Japan

[21] Appl. No.: 723,387

[22] Filed: Jun. 28, 1991

[30] Foreign Application Priority Data

Jul. 3, 1990 [JP] Japan .................. 2-176993

[51] Int. Cl.⁵ .................. H04N 1/40; H04N 1/41
[52] U.S. Cl. .................. 358/261.1; 358/261.3; 358/427
[58] Field of Search .................. 358/261.1, 426, 432, 358/433, 467, 470, 261.2, 261.3, 427

[56] References Cited

U.S. PATENT DOCUMENTS

| 4,262,309 | 4/1981 | Yamaguchi et al. | 358/260 |
| 4,626,921 | 12/1986 | Ohtani et al. | 358/260 |
| 4,750,043 | 6/1988 | Hisada et al. | 358/261 |
| 4,757,552 | 7/1988 | Asano et al. | 382/54 |
| 4,800,441 | 1/1989 | Sato | 358/261.1 |
| 4,807,043 | 2/1989 | Kaku et al. | 358/261.3 |
| 4,860,114 | 8/1989 | Horikawa et al. | 358/426 |

FOREIGN PATENT DOCUMENTS

A20211611 2/1987 European Pat. Off.

Primary Examiner—Richard E. Chilcot, Jr.
Assistant Examiner—Rafael Bacares
Attorney, Agent, or Firm—Fitzpatrick, Cella, Harper & Scinto

[57] ABSTRACT

A data processing apparatus comprises: code analyzing means for analyzing input code data encoded by a two-dimension encoding system; developing means for developing the code data in accordance with an analysis result by the code analyzing means, to produce decoded data; and means for stopping the analysis by the code analyzing means by detecting a horizontal mode code by the code analyzing means, and resuming the analysis by the code analyzing means by the completion of the development of the analyzed code data by the developing means. The code analyzing means and the developing means are parallelly operated, and upon detection of the horizontal mode code, the analysis by the code analyzing means is temporarily stopped until the development of the analyzed code data is over.

17 Claims, 4 Drawing Sheets

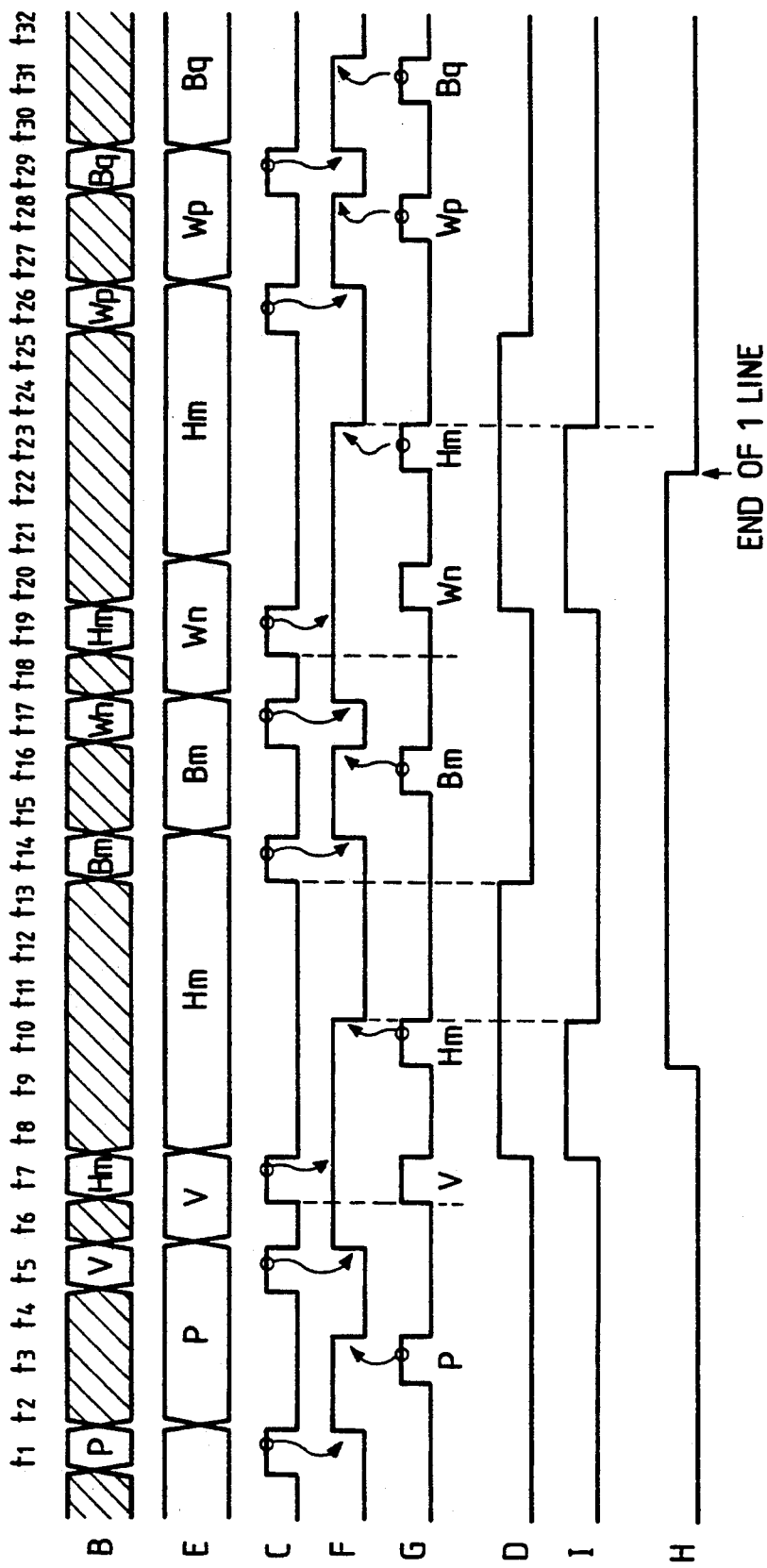

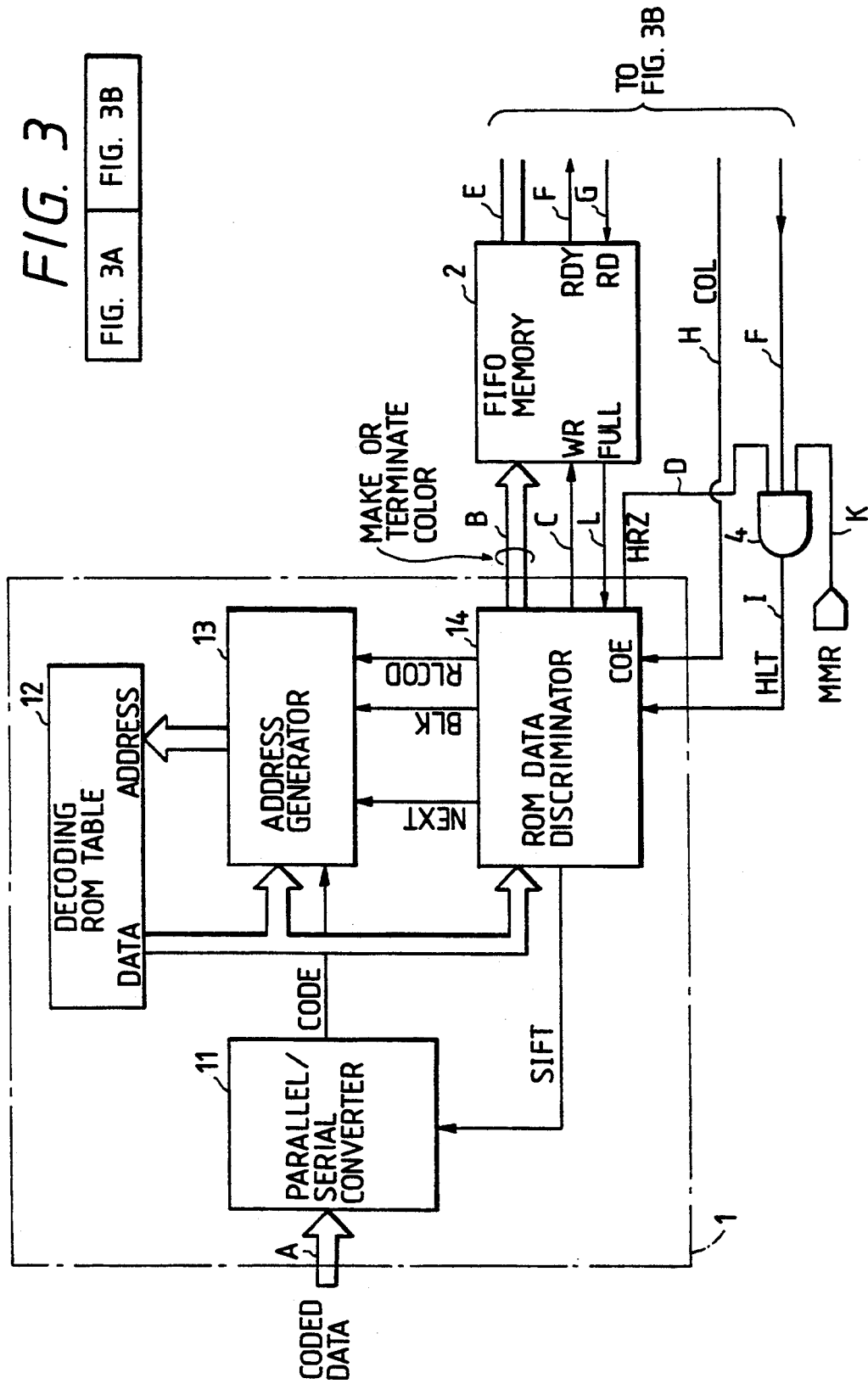

DATA PROCESSING APPARATUS

BACKGROUND OF THE INVENTION

1. Field of the Invention

The present invention relates to a data processing apparatus for decoding encoded data.

2. Related Background Art

In the modified Huffmann code (MH code) by the modified Huffmann system which is one of one-dimension encoding systems, a punctuation of one main scan line is represented by an end of line code (EOL code). Accordingly, in the MH code or the MR code, the start of next main scan line can be recognized by the EOL code, and it may be readily defined by the EOL code to make white a start pixel at the start of decoding of the main scan line. Thus, in decoding the MH code, the start of the next line can be readily recognized even if the decoding of the code and the development of the code are parallelly executed.

However, the code (MR code) by the modified Reed system which is a two-dimensional encoding system includes line data without EOL code, and the code (MMR code) by the modified modified Reed system does not include the EOL code unlike the MH code.

On the other hand, in the MR code and the MMR code, a code which represents a pass mode is constant without regard to a color of a starting pixel, but a run-length code (RL code) following a horizontal mode changes depending on the color of the starting pixel. When the decoding of one main scan line is completed and the decoding of the next main scan line is to be started, the starting pixel must forcibly defined as white.

As a result, when the RL code following the horizontal mode is to be analyzed, the lines appear in the order of black and white if the line continue from the previous codes in the course of decoding of the main scan line, but they may appear in the order of white and black depending on the development by a developing unit.

Accordingly, in the decoding of the MR code or the MMR code, a code analyzing unit and a developing unit are alternately activated to reflect the development by the developing unit and the code analysis. However, because of the alternate activation of the analyzing unit and the developing unit the decoding time is long.

U.S. Pat. No. 4,750,043 discloses the decoding of a two-dimension code but no proposal to solve the above problem has been made.

SUMMARY OF THE INVENTION

It is an object of the present invention to improve a data processing apparatus in the light of the above problem.

It is another object of the present invention to rapidly decode code data encoded by a two-dimension encoding system.

It is still another object of the present invention to rapidly decode code data encoded by the two-dimension encoding system by parallel processing of code analysis of the code data and development of analyzed code data.

It is still another object of the present invention to rapidly and correctly decode code data encoded by the two-dimension encoding system by parallel processing of the code analysis of the code data and the development of the analyzed code data, and pausing the code analysis when a horizontal mode code is detected by the code analysis and resuming the code analysis at the end of the development of the analyzed code data.

Other objects of the present invention will be apparent from the following description of the preferred embodiments and the drawings.

BRIEF DESCRIPTION OF THE DRAWINGS

FIG. 2 shows a timing chart of operation timings of various elements in FIG. 1, and FIGS. 3, 3B show a detailed configuration of the embodiment.

DETAILED DESCRIPTION OF THE PREFERRED EMBODIMENTS

One embodiment of the present invention is now explained in detail with reference to the drawings.

Figure 1:
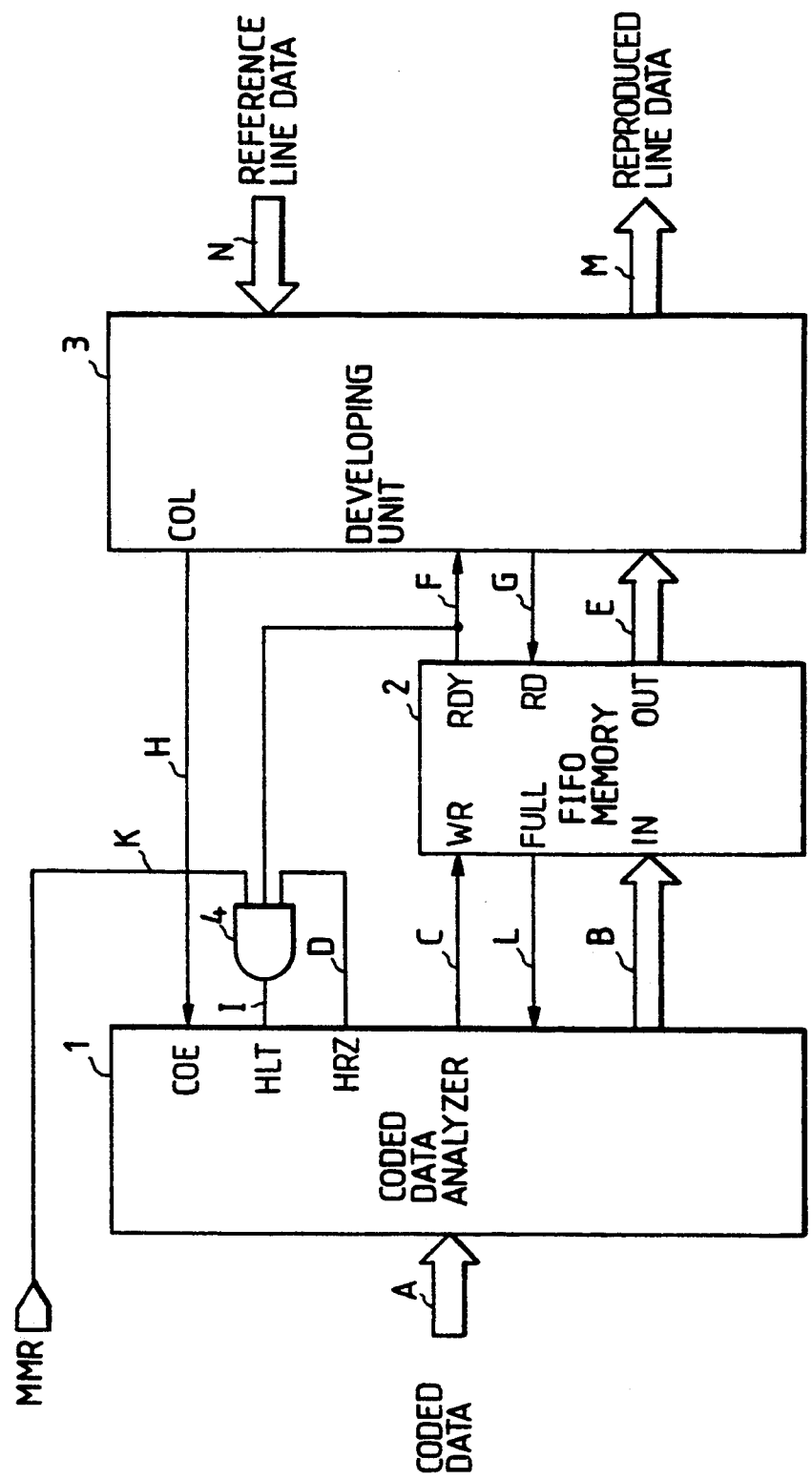
FIG. 1 shows a block diagram of a decoding unit in an embodiment.

FIG. 1 shows a block diagram of a basic configuration of a decoding unit in the embodiment.

In FIG. 1, numeral 1 denotes a code analyzer which receives a MH, MR or MMR code as input data, sequentially analyzes input code lines A and outputs analysis result data B.

Numeral 2 denotes a first-in first-out (FIFO) memory which receives the analysis result of the code analyzer 1, temporarily stores the analysis result data B, and outputs data (E) in the order of input.

Numeral 3 denotes a developing unit which receives the data E (analysis result data) from the FIFO memory 2, sequentially develops it into raw image data (decoded data) and outputs the decoded data M.

Numeral 4 denotes an AND gate which produces a high level output when the code to be decoded is the MMR code.

In FIG. 1, a symbol A denote code data applied to the code analyzer 1.

The analysis result data B from the code analyzer 1 is run-length data if the analyzed code is a run-length code, and if it is other code such as pass mode code, horizontal mode code, vertical mode code or EOL code, the data B is data corresponding to the analyzed code.

A signal C supplied by the code analyzer 1 to the FIFO memory 2 is "1" (high level) to request the writing of the data to the FIFO memory 2 when the analysis result data B is valid.

A signal D supplied from an output terminal HRZ of the code analyzer 1 to the AND gate 4 is a horizontal mode representation signal which is "1" (high level) when the code analyzer 1 detects the horizontal mode code, and "0" (low level) when it next detects a valid run-length code.

A signal F supplied from an output terminal RDY of the FIFO memory 2 to the developing unit 3 is a ready signal which is "1" (high level) when valid data which can be read is present in the FIFO memory 2.

A signal G supplied from the developing unit 3 to the FIFO memory 2 is a read signal for the developing unit 3 to read one data from the FIFO memory 2. When the read signal is "1" (high level), one data is read from the FIFO memory 2 and the data (data E) is supplied to the development unit 3.

A signal H supplied from the development unit 3 to the code analyzer 1 is a signal which represents a color of a starting pixel $a_0$ which is initialized to "0" (low level) at each start of one main scan line and inverted at each termination of the development of the vertical mode signal.

A signal I supplied from the AND gate 4 to the code analyzer 1 is a pause signal for temporarily deactivating the code analyzer when it is "1" (high level).

A signal K supplied to the AND gate 4 indicates that the code data supplied to the code analyzer 1 is the MMR code.

A signal L supplied from the FIFO memory 2 to the code analyzer 1 is a FIFO full signal which is "1" (high level) when the amount of valid data in the FIFO memory 2 reaches the memory capacity of the FIFO memory 2. The code analyzer 1 suspends the writing of new data to the FIFO memory 2 until the FIFO full signal changes to "0" (low level).

Data M supplied from the developing unit 3 is one developed from the code data and it is the decoded line data.

Data N supplied to the developing unit 3 is pixel data (reference line data) which the developing unit 3 refers to in the development of the code data.

The decoded line data supplied from the developing unit 3 is sent to an image data reproducing device such as an image data display or printer for the reproduction of the image, and also held in a line buffer memory (not shown) for use as the reference line data N.

The code data A is one received by facsimile communication or stored in an image memory, and supplied from a code data generator such as an image data receiver or an image memory reader. The signal K which indicates whether the code data is the MMR code or not is also supplied from the code data generator.

The decode operation of FIG. 1 is now explained.

First, the MMR code is supplied to the code analyzer 1 as the signal A. The code analyzer 1 sequentially analyzes the MMR code which is encoded by a variable length code architecture, converts it to a fixed length code, and delivers it to the succeeding stage FIFO 2. The fixed length code may be seven kinds of vertical mode codes, pass mode code, horizontal mode code, run-lengths of make-up and terminate for each of white run and black run, or EOL code.

A write request to the FIFO memory 2 is represented by the signal C. When there is no room for writing in the FIFO memory 2, it is represented by the signal L.

When data is applied to the FIFO memory 2, the presence of valid data in the FIFO memory 2 is represented by the signal F.

When the developing unit 3 detects the presence of the valid data by the signal F, it issues a read request by the signal G. In response to the read request by the signal G, the FIFO memory 2 reads the data in the memory and supplies the data E to the developing unit 3. The developing unit 3 receives the pixel data of the reference line by the signal N, generates the pixel data of the decoded line by the pixel data of the reference line and the code data E from the FIFO memory 2, and outputs it as the signal M.

The signal H supplied by the developing unit 3 is initialized to "0" at each start of the reproduction of a predetermined main scan line, represents that the data read from the FIFO memory 2 is the vertical mode data, and is inverted each time the development is completed.

The code analyzer 1 refers the signal H at the start of the analysis of a first run-length code following a horizontal mode code in the decoding of the MMR code, and executes the analysis of the run-length code in the order of white run and black run if the signal H is "0", and in the order of black run and white run if the signal H is "1".

In the analysis of the MH or MR code, the code analyzer 1 does not refer the signal H but internally generates a signal which is initialized to "0" when the EOL code is detected and inverted when the vertical mode code is detected, for use in place of the signal H.

Major operations of the present embodiment are now explained.

When the code analyzer 1 detects the horizontal mode code "001" as the result of the analysis of the code input A, it changes the signal D to "1" to indicate the detection of the horizontal mode code. At the same time, the fixed length code representing the horizontal mode code is supplied to the FIFO memory 2 and the signal F is changed to "1".

On the other hand, the signal K is "1" when the code input A is the MMR code. Thus, the output I of the AND gate 4 is "1". When the output signal I is "1", it inhibits the analysis operation of the code analyzer 1.

Accordingly, the code analyzer 1 stops the analysis until the developing unit 3 reads all data in the FIFO memory 2, that is, until the developing unit 3 receives the horizontal mode code lastly applied to the FIFO memory 2. When the horizontal mode code of the FIFO memory 2 is sent to the developing unit 3, the signal F changes to "0", the output I of the AND gate 4 changes to "0" and the code analyzer 1 resumes the analysis. The code analyzer 1 executes the analysis of the run-length code depending on whether the signal H is "1" or "0".

In the decoding unit of the present embodiment, the code analyzer 1 and the developing unit 3 are parallelly operated in the decoding of the MMR code until the code analyzer 1 detects the horizontal mode code. When the code analyzer 1 detects the horizontal mode code, the code analyzer 1 is temporarily deactivated and the development of the code data by the developing unit 3 is continued. When the developing unit 3 receives the horizontal mode code, the deactivated code analyzer 1 resumes the operation. The code analyzer 1 analyzes the run-length code following to the horizontal mode code in accordance with the signal H from the developing unit 3.

Since the code analyzer 1 and the developing unit 3 are parallelly operated until the horizontal mode code is detected, the decoding of the MMR code is attained rapidly, and the analysis of the run-length code following to the horizontal mode code is properly effected.

FIG. 2 shows a timing chart of the operation in the embodiment of FIG. 1. In FIG. 2, $t_1-t_{32}$ represent timings.

At a timing $t_1$, the code analyzer 1 detects the pass mode code P and supplies the pass mode code data (signal B) and the write request signal C to the FIFO memory to write the pass mode code data to the FIFO memory 2.

At a timing $t_2$, the signal F which indicates the presence of valid data in the FIFO memory 2 changes to "1", and the pass mode code P is supplied to the data output E of the FIFO memory 2.

At a timing $t_3$, the ready signal F is "1" and the developing unit 3 changes the read request signal G to "1" to receive the pass mode code P which is at the data output E. Then, it executes the development of the pass mode code P. In the development of the pass mode code, the white pixel data or the black pixel data from a transition point of the reference line data N under consideration to the next transistion point is outputted as the decoded data.

At a timing $t_4$, the FIFO memory 2 recognizes the readout of the data in the memory 2 by the signal at the timing $t_3$, and changes the ready signal F to "0".

At a timing $t_5$, when the code analyzer 1 detects the vertical mode code V, it changes the write request signal C to "1" and supplies the vertical mode code data V to the FIFO memory 2 to store it in the FIFO memory 2. The signal H is inverted when the developing unit 3 develops the data V at a timing $t_{10}$.

At a timing $t_6$, the ready signal F which indicates the presence of valid data in the FIFO memory 2 is "1" as it is at the timing $t_2$, and the vertical mode code data V is supplied to the data output E of the FIFO memory 2.

At a timing $t_7$, the developing unit 3 receives the vertical mode code data V and develops it as it does at the timing $t_3$, and the code analyzer 1 detects the horizontal mode code and stores the horizontal mode code data Hm in the FIFO memory 2.

At a timing $t_8$, the code analyzer 1 changes the signal D to "1" as the result of the output of the horizontal mode code data Hm at the timing $t_7$. On the other hand, the ready signal F from the output of the FIFO memory 2 is also "1". Thus, the output I of the AND gate 4 is "1" and the code analyzer 1 is deactivated.

At a timing $t_9$, the horizontal mode code data Hm is supplied from the FIFO memory 2 to the developing unit 3.

At a timing $t_{10}$, when the developing unit 3 receives the horizontal mode code data Hm from the FIFO memory 2, it means that all valid data in the FIFO memory 2 have been read into the developing unit 3, and the ready signal F is now "0". The output I of the AND gate 4 is again "0" and the code analyzer 1 resume the analysis.

Since the signal H is now "1", the run-length code following to the horizontal mode code is analyzed in the order of black run and white run. At timings $t_{14}$ and $t_{17}$, black run Bm and white run Wn are supplied to the FIFO memory 2, respectively as the analysis results and they are decoded to the original image in the developing unit 3.

At a timing $t_{19}$, when the horizontal mode code is again detected, the code analyzer 1 is deactivated until the developing unit 3 process all data in the FIFO memory 2, as it is at the timing $t_7$.

On the other hand, when the developing unit 3 has decoded the pixels corresponding to the predetermined main scan line as the result of the development of the white line Wn, the signal H is initialized to "0".

As the signal H is changed to "0", the code analyzer 1 need not recognize the return to the start of one main scan line and the subsequent run-length code is analyzed in the order of white run and black run.

At a timing $t_{23}$, the developing unit 3 reads the horizontal mode code Hm from the FIFO memory 2, and the signal I is changed to "0". Thus, the code analyzer 1 refers the signal H to resume the analysis of the code in order to detect the white run-length. As a result, two runs following to the second horizontal mode code in the drawing are analyzed in the order of white run and black run.

In the above embodiment, the code analyzer 1 supplies the data Hm indicating the horizontal mode to the FIFO memory 2 in order to indicate that the developing unit 3 has completed the previous process. Instead of supplying the data Hm to the FIFO memory 2, the developing unit 3 may directly supply a signal indicating the completion of the process.

FIG. 3 shows a detailed configuration of the code analyzer 1 and the developing unit 3.

The code analyzer 1 comprises a parallel-to-serial converter 11, a decoding ROM table 12, an address generator 13 and a ROM data discriminator 14.

The developing unit 3 comprises a development control circuit 31, a transition data generator 32, a two-dimension reproducing circuit 33, a run-length (RL) counter 34, a reference line data input circuit 35, a RAM address generator 36, a reproduced pixcel generator 37 and a one-line length counter 38.

Reproduced line data supplied from the developing unit 3 is stored in the line memory 5 (which comprises a RAM). The reference line data is read from the line memory 5.

Parallel code data comprising a predetermined number of bits (8 bits) is converted to a serial signal by the parallel-to-serial converter, which outputs the serial signal, bit by bit, to the address generator 13 in accordance with a clock SIFT from the ROM data discriminator 14. The address generator 13 generates a next ROM reference address in accordance with the one-bit code data from the parallel-to-serial converter 11, the data read from the decoding ROM table 12 at the previous processing, the signal (BLK) representing the color of the starting pixel from the ROM data discriminator 14, and the signal (RLCOD) indicating whether the run-length data following to the horizontal mode code or not. The address generator 13 updates the address by the signal NEXT from the ROM data discriminator 14.

The ROM data discriminator 14 determines whether the code has been established or not in accordance with the data content from the ROM table 12, and if it has not been established, it supplies the signal NEXT to the address generator 13 to repeat the accessing to the ROM table 12 until the code is established. When the code is established, it sends the write request signal C to the FIFO memory 2, and if the signal L which indicates that the FIFO memory 2 is full is not present, it supplies the analyzed data to the FIFO memory 2. If the established code is the horizontal mode code "001", it supplies the horizontal mode code detection signal HRZ. When the signal I (HLT) which pauses the analysis of the code is supplied from the AND gate 4 of FIG. 1 to the ROM data discriminator 14, it stops to send the clock SIFT to the parallel-to-serial converter 11 and turns off the signal NEXT supplied to the address generator 13 to stop the analysis of the code. When the signal I (HLT) is turned off, the ROM data discriminator 14 determines the color of the signal BLK in accordance with the color of the signal H, sends the signal RLCOD to the address generator 13, and supplies the signal NEXT and the clock SIFT to resume the analysis. In this manner, the run-length data following to the horizontal mode code "001" is analyzed.

On the other hand, the development control circuit 31 supplies the read request signal G to the FIFO memory 2 when the valid data is present in the FIFO memory 2 (the signal F is high level) to read the analyzed data from the FIFO memory 2. If the analyzed data read from the FIFO memory 2 is the two-dimension code (pass mode code P, or seven kinds of vertical mode codes $V_0$, $VL_1$, $VL_2$, $VL_3$, $VR_1$, $VR_2$, $VR_3$), it sends the two-dimension code to the two-dimension reproducing circuit 33. The developing control circuit 31 supplies to a transition point data generator 32 a signal CSEL to select one of transition point information from white to black and transition point information from black to white generated by the transition point data generator 32 as the transition point to be referred. The development of the two-dimension code is continued until the development signal DET2 from the two-dimension reproducing circuit 33 is turned off (low level). On the other hand, when the analyzed data read from the FIFO memory 2 is the run-length data, the run-length data and information indicating the type, terminate or make-up, are sent to the run-length counter 34. The development is continued until the development of the run-length data by the run-length counter 34 is completed and the signal DET1 is turned off. The development control circuit 31 counts the serial developed data from the RL counter 34 and converts it to the parallel data, and sends a signal COLOR which designates the colors of the developed reproduced pixels to the reproduced pixel generator 37 which generates the reproduced pixels. The reproduced pixel generator 37 outputs pixel data of the color designated by the signal COLOR as the parallel data of the predetermined number of bits (8 bits), sends a write request signal REQW of the reproduced image to the RAM address generator 36, and when the write address for the reproduced image is determined by the RAM address generator 36 and a write permit signal ACKW is issued, it sends the reproduced image to the line memory 5.

In synchronism with the development, the reference line data is read from the line memory 5 by the reference line data input circuit 35 at a unit of parallel data of predetermined bits (8 bits), and it is converted to the serial signal which is sent, bit by bit, to the transition point data generator 32. The reference line data input circuit 35 sends the read request signal REQR for the reference image from the line memory, to the RAM address generator 36. When the read address is determined by the RAM address generator 36, a read permit signal ACKR is sent to the reference line data input circuit 35. Thus, the reference line data input circuit 35 reads the parallel data from the line memory 5.

The developed data from the two-dimension reproducing circuit 33 or the RL counter 34 is counted by the one-line length counter 38. When the bits corresponding to one line length (for example, 1728 bits for the size A4 image) are counted by the counter 38, a signal LEND indicating that pixels of one line have been reproduced is supplied from the counter 38 to the development control circuit 31. When the control signal 31 receives the signal LEND, it initializes the color of the signal H (COL) to white. The development control circuit 31 inverts the color of the signal H (COL) each time the development of the vertical mode code is over.

In this manner, the code data encoded by the two-dimension encoding system explained in FIG. 2 is decoded.

In the above embodiment, for simplification, the white run and the black run are supplied to the FIFO memory 2 as one data. Where the make-up code is present, there are two methods.

1) The make-up run-length and the terminate run-length are combined in the code analyzer 1 into one run-length data, which is sent to the FIFO memory 2.

2) Whenever the make-up run-length or the terminate run-length is detected, it is sent to the FIFO memory 2.

In the above embodiment, in the decoding of the MMR code, the code analyzer is temporarily deactivated when the horizontal mode is detected. A similar operation may be done in the decoding of the MR code. Further, a similar operation may be done in the decoding of the MH code without problem because the horizontal mode code is not present.

In the above embodiment, the FIFO memory 2 is used although a simple buffer register may be used.

When the decoding unit of FIG. 1 is used as a decoder for code data in a facsimile device or a filing device, the facsimile device or the filing device which can rapidly decode the MR code or the MMR code are provided.

The present invention is not limited to the above embodiment but various modifications thereof may be made.

I claim:

1. A data processing apparatus for decoding code data encoded by a two-dimension encoding system, the code data including (1) first code data not requiring a decoding result of previous code data for decoding and (2) second code data requiring the decoding result of previous code data for decoding, said apparatus comprising:

code analyzing means for analyzing the code data, said code analyzing means determining whether the code data is the first code data or the second code data; and developing means for developing the code data in accordance with an analyzing result by said code analyzing means, to produce pixel data corresponding to the code data;

wherein, when said code analyzing means determines the code data is the first code data, said code analyzing means analyzes the code data regardless of a developing operation by said developing means, and when said code analyzing means determines the code data is the second code data, said code analyzing means temporarily stops analyzing the code data until said developing means completes a developing operation for the previous code data.

2. A data processing apparatus according to claim 1, further comprising stopping means for stopping an analyzing operation by said code analyzing means when said analyzing means determines the code data is the second code data.

3. A data processing apparatus according to claim 1, further comprising memory means for storing the analyzing result of said code analyzing means and wherein said developing means reads the analyzing result stored in said memory means for developing the code data.

4. A data processing apparatus according to claim 1, wherein the code data is encoded by a modified REED (MR) coding system.

5. A data processing apparatus according to claim 1, wherein the code data is encoded by a modified modified REED (MMR) coding system.

6. A data processing apparatus according to claims 4 or 5, wherein the second code data is encoded in accordance with a horizontal mode.

7. A data processing apparatus according to claim 6, wherein the second code data includes a flag code representing the horizontal mode and a run-length code representing a length and a color of run.

8. A data processing apparatus according to claim 7, wherein said code analyzing means analyzes the run-length code after said developing means completes a developing operation for the previous code data.

9. A data processing apparatus according to claim 8, wherein said code analyzing means analyzes the run-length code in accordance with a developing result of previous code data.

10. A data processing method for decoding code data encoded by a two-dimension encoding system, the code data including (1) first code data not requiring a decoding result of previous code data for decoding and (2) second code data requiring a decoding result of previous code data for decoding, comprising:
   a determining step of determining whether the code data is the first code data or the second code data;
   an analyzing step of analyzing the code data;
   a developing step of developing the code data in accordance with an analyzing result of said analyzing step, to produce pixel data corresponding to the code data;
   an operation step of operating said analyzing step regardless of a developing operation of said developing step, when the determining step determines the code data is the first code data; and
   a stopping step of temporarily stopping said analyzing step until said developing step completes a developing operation for the previous code data when the determining step determines that the code data is the second code data.

11. A data processing method according to claim 10, further comprising a storing step of storing the analyzing result of said analyzing step, wherein said developing step reads the stored analyzing result for developing the code data.

12. A data processing method according to claim 10, wherein the code data is encoded by a modified REED (MR) coding system.

13. A data processing method according to claim 10, wherein the code data is encoded by a modified modified REED (MMR) coding system.

14. A data processing method according to claims 12 or 13, wherein the second code data is encoded in accordance with a horizontal mode.

15. A data processing method according to claim 14, wherein the second code data includes a flag code representing the horizontal mode and a run-length code representing a length and a color of run.

16. A data processing method according to claim 15, wherein said code analyzing step analyzes the run-length code after said developing step completes a developing operation for the previous code data.

17. A data processing method according to claim 16, wherein said code analyzing step analyzes the run-length code in accordance with a developing result of the previous code data.

* * * * *

UNITED STATES PATENT AND TRADEMARK OFFICE
CERTIFICATE OF CORRECTION

PATENT NO. : 5,280,361
DATED : January 18, 1994
INVENTOR(S) : YUJI ISHIKAWA

Page 1 of 2

It is certified that error appears in the above-identified patent and that said Letters Patent is hereby corrected as shown below:

COLUMN 1

Line 34, "defined" should read --be defined--.
    Line 37, "continue" should read --continues--.
    Line 67, "pausing" should read --pausing in--.

COLUMN 2

Figure 3B:
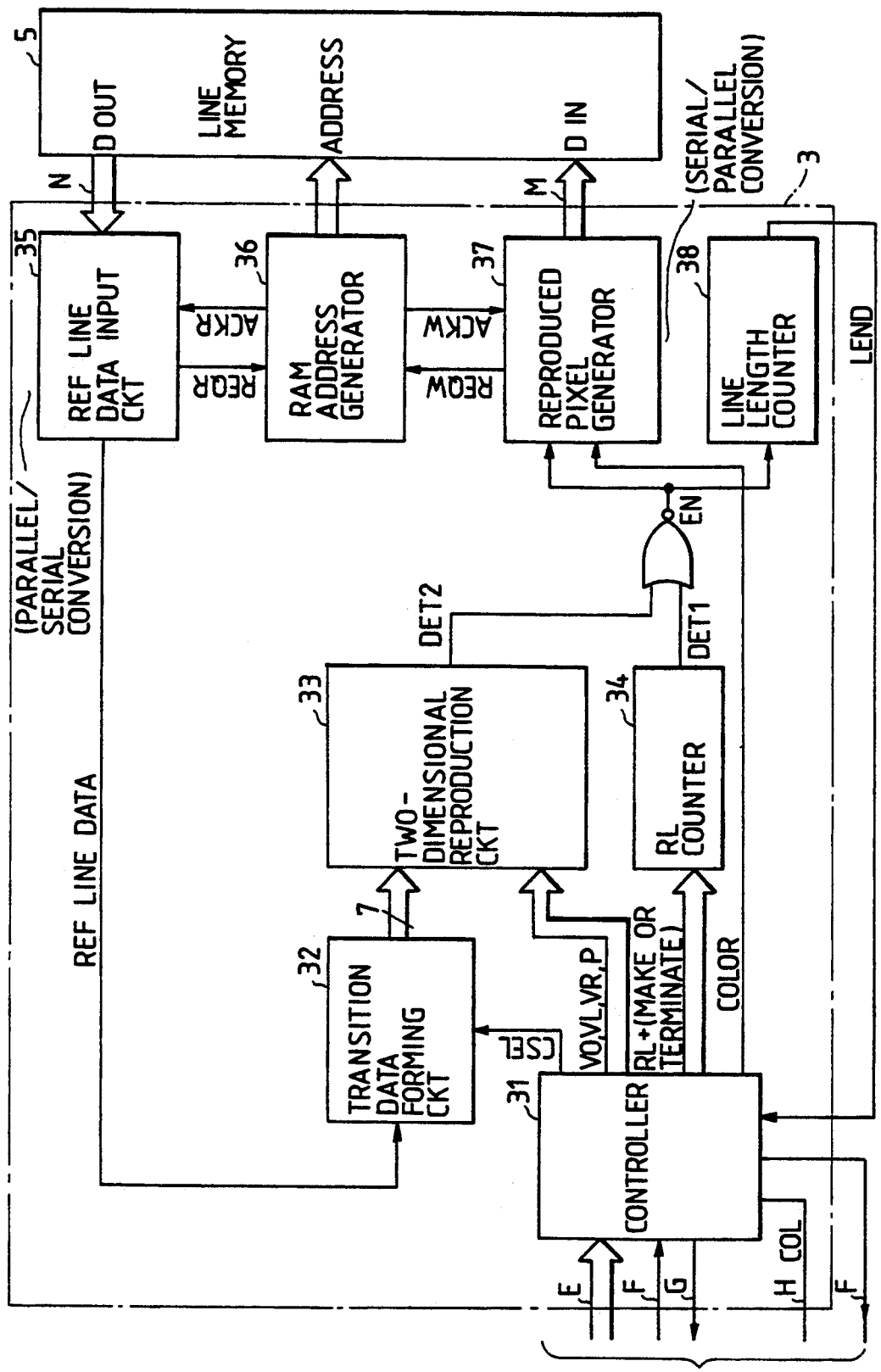

Line 12, "FIGS. 3, 3B" should read --FIGS. 3, 3A and 3B--.
    Line 36, "denote" should read --denotes--.

COLUMN 3

Line 38, "FIFO 2." should read --FIFO memory 2.--.

COLUMN 4

Line 43, "to" should be deleted.
    Line 50, "to" should be deleted.

COLUMN 5

Line 36, "resume" should read --resumes--.
    Line 47, "process" should read --processes--.
    Line 62, "to" should be deleted.

COLUMN 6

Line 13, "pixcel" should read --pixel--.
    Line 31, "to" should be deleted.
    Line 57, "to" should be deleted.

UNITED STATES PATENT AND TRADEMARK OFFICE
CERTIFICATE OF CORRECTION

PATENT NO. : 5,280,361
DATED : January 18, 1994
INVENTOR(S) : YUJI ISHIKAWA

It is certified that error appears in the above-identified patent and that said Letters Patent is hereby corrected as shown below:

<u>COLUMN 7</u>

Line 50, "signal 31" should read --circuit 31--.

Signed and Sealed this

Ninth Day of August, 1994

Attest:

BRUCE LEHMAN

*Attesting Officer*     *Commissioner of Patents and Trademarks*